United States Patent [19]

Kemmesies

[11] 4,263,591

[45] Apr. 21, 1981

[54] ELECTRIC TRANSMISSION SYSTEM

[75] Inventor: Hartmut Kemmesies, Puchheim-Bhf., Fed. Rep. of Germany

[73] Assignee: Siemens Aktiengesellschaft, Berlin & Munich, Fed. Rep. of Germany

[21] Appl. No.: 15,004

[22] Filed: Feb. 26, 1979

[30] Foreign Application Priority Data

Mar. 7, 1978 [DE] Fed. Rep. of Germany ....... 2809775

[51] Int. Cl.³ .............................................. H04G 9/00
[52] U.S. Cl. ................................. 340/695; 340/167 R
[58] Field of Search ..................... 325/38 B, 390, 391, 325/392; 340/167 R, 168 R, 694, 695, 696; 343/225; 375/68, 70, 73

[56] References Cited

U.S. PATENT DOCUMENTS 3,631,398  12/1971  Houghton ........................ 340/168 R

OTHER PUBLICATIONS

Funkschau (1975) vol. 17/503, pp. 69–72.
Funkschau (1976) vol. 5, pp. 46–50.

Primary Examiner—Benedict V. Safourek
Attorney, Agent, or Firm—Hill, Van Santen, Steadman, Chiara & Simpson

[57]  ABSTRACT

An electronic system for the transmission of binary coded pulse information is comprised of a transmitter and a receiver. The transmitter is provided with circuitry for the generation of a pre-signal pulse which is produced upon the actuation of respective command inputs. The pre-signal pulse is combined with and transmitted a fixed period ahead of the pulses representing the command information. The receiver is provided with a pre-amplifier stage having an inherently fixed response time, such that receipt of the pre-signal pulse prepares the pre-amplifier for handling of the coded information without a loss of information resulting from distortion during the initial response time of the pre-amplifier.

4 Claims, 3 Drawing Figures

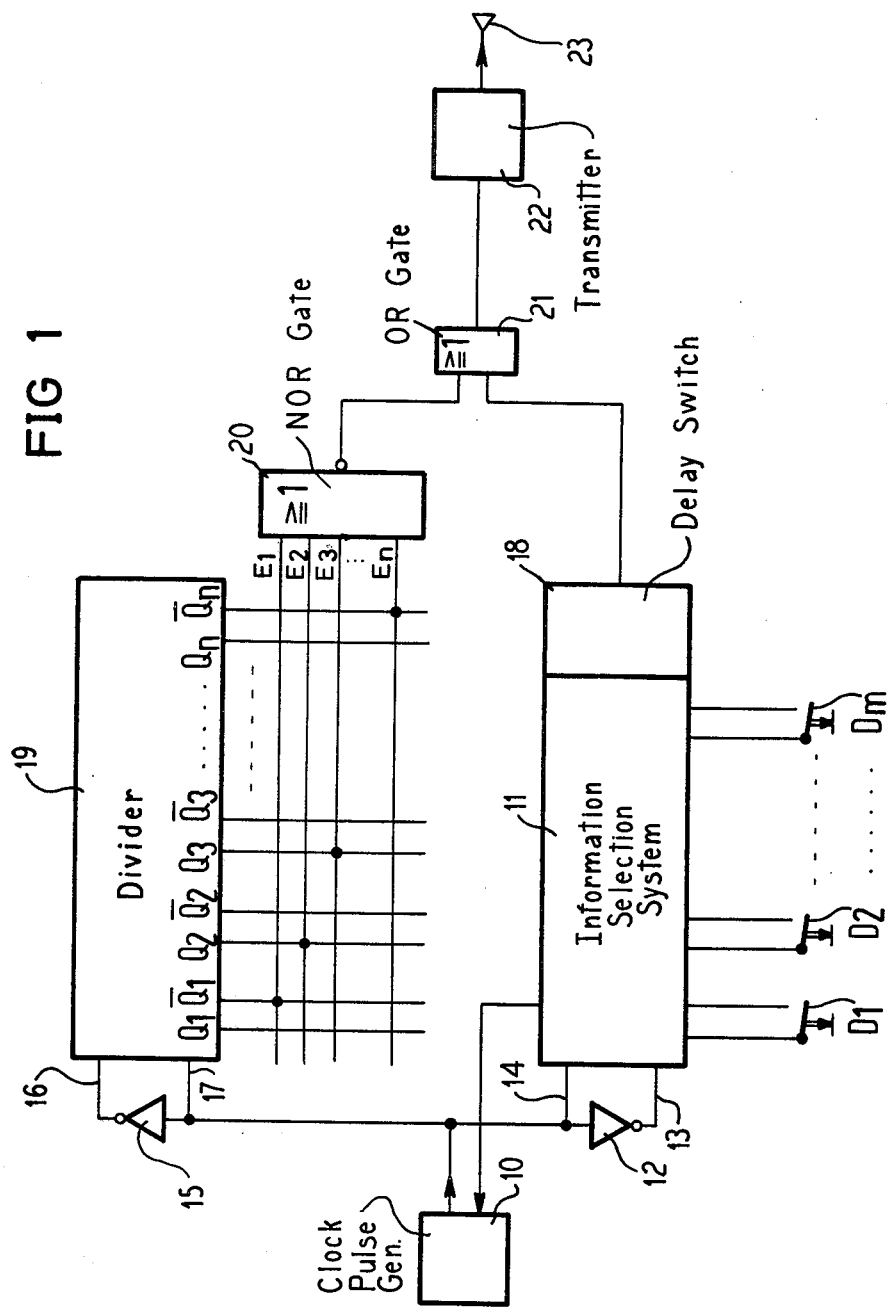

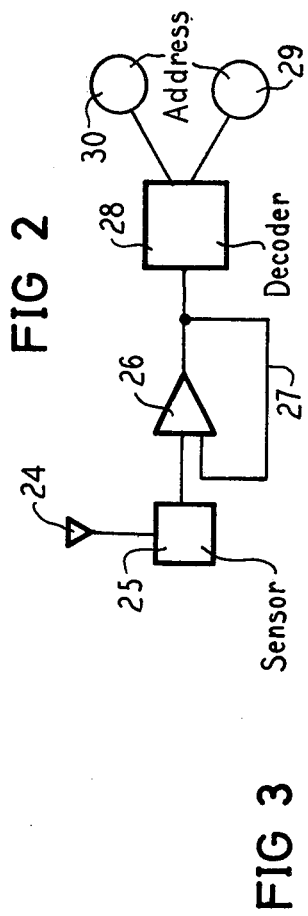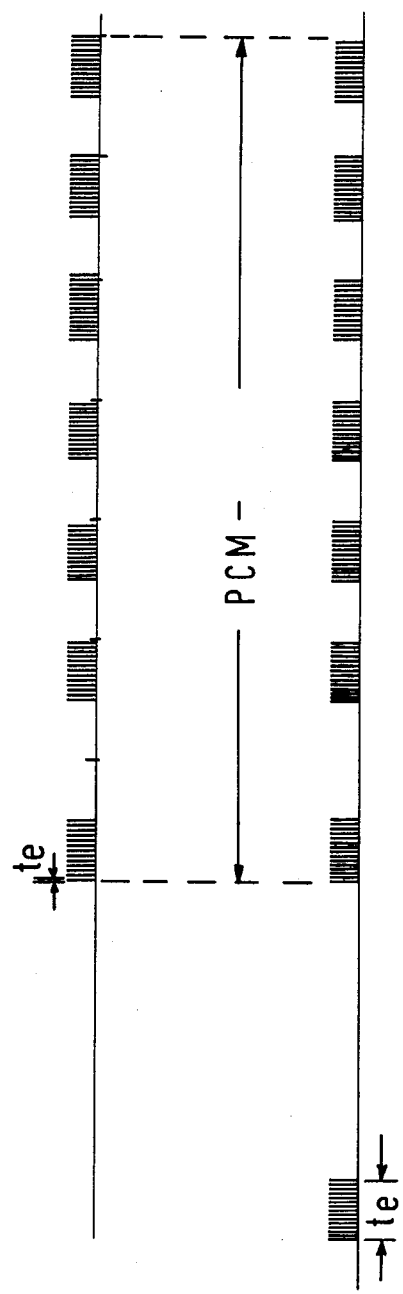

ELECTRIC TRANSMISSION SYSTEM

BACKGROUND OF THE INVENTION

1. Field of the Invention

The present invention relate to electronic data transmission systems utilizing pulse code modulation, and particularly to such systems utilized for the remote control of electronic devices.

2. Description of the Prior Art

Data transmission systems which transmit information represented by the number, temporal position, and duration of groups of digital pulses are well known in the art. In such data transmission systems, however, particularly in the transmission of PCM words such as in the remote control of television receivers, a precise processing of the form of the pulse groups arriving at the receiver of the information is necessary. This requires a preamplifier capable of operation at a speed such that the first coded word received can be accurately interpreted without distortion or loss of information.

Accordingly, systems known in the art utilize a pre-amplifier in the receiver and provide the pre-amplifier with a number of cascaded feedback loops in order to achieve the necessary regulation. The use of a number of such feedback loops results in added expense and complexity in the production of such data transmission systems. Further, the use of such feedback loops makes production of the pre-amplifier stage of the receiver difficult in the form of a monolithic integrated semicondutor module.

SUMMARY OF THE INVENTION

In accordance with the principles of the present invention an electronic data transmission system utilizing pulse code modulaton is provided with a plurality of input means, such as, but not limited to, push button or keys, which not only enter designated command information, but also simultaneously activate a clock pulse generator for the production of a pre-signal pulse to be transmitted ahead of the respective pulse groups representing the command information.

In the receiving portion of the data transmission system, the pre-signal pulse is received a fixed period ahead of the pulse group so that a pre-amplifier contained in the receiving stage can be activated by the pre-signal pulse before processing the coded information. There is thus no loss or distortion of information resulting from the amplifier processing the pulse groups during its initial response time, because said response time will have already elapsed shortly after receipt of the pre-signal pulse. Because the pre-signal pulse contains no command information, distortion of the pre-signal pulse during the response time of the amplifier is of no consequence, and the amplifier is then prepared to process the following pulse group with no loss of information.

BRIEF DESCRIPTION OF THE DRAWINGS

FIG. 1 is a schematic diagram of a transmitter portion of a data transmission system in accordance with the present invention.

FIG. 2 is a receiver portion associated with the transmission portion of FIG. 1 for a data transmission system.

FIG. 3 is a graph showing how pulse coded information may be distorted upon receipt thereof.

BRIEF DESCRIPTION OF THE PREFERRED EMBODIMENTS

A transmission portion of an electronic data transmission system is schematically shown in FIG. 1. A series of manually operated command input means $D_1$, $D_2$, through $D_m$ are connected to an information selection system 11. The input means $D_1$ through $D_m$ may be of any form, for example, but not limited to, depressible buttons or keys.

The information selection system 11 is connected to a clock pulse generator 10, which is activated by depression of any of the input means $D_1$ through $D_m$. The entered commands in the information selection system are stored therein by means of a read only memory which is in turn sampled at a rate determined by the clock pulse generator 10. For this purpose, the generator 10 is connected through an amplifier 12 to the information selection system 11, by means of an inverting input 13 and a non-inverting input 14.

The output of the clock pulse generator 10 is also connected through an amplifier 15 to a divider 19 by means of an inverting input 16 and a non-inverting input 17. The divider 19 may be an asynchronous pulse counter comprised of a chain of identical flip-flops. Each flip-flop cell has an input for a non-inverted pulse and an input for an inverted pulse, to which the outputs Q and $\overline{Q}$ of the individual flip-flop cells correspond.

For each individual flip-flop contained in the divider 19, one associated output Q or $\overline{Q}$ is connected to one input $E_1$, $E_2$, through $E_n$ of a multiple input NOR-gate 20. The output of the NOR-gate 20 will thus display a pre-signal pulse when any of the command inputs $D_1$ through $D_m$ is actuated.

The information selection system 11 converts the command information entered via the inputs $D_1$ through $D_m$ to pulse coded information and transmits that information to a delay switch 18. The delay associated with the delay switch 18 is such as to insure that the output of the NOR-gate 20, i.e., the pre-signal pulse, will reach an input of an OR-gate 21 prior to the information from the delay switch 18, which is also connected to the OR-gate 21. The pre-signal pulse and the coded information are combined at the output of the OR-gate 21 and converted to propagatble electromagnetic waves by means of a transmitter 22, and sent to a receiver by an antenna 23.

A receiver operating in association with the transmitting means of FIG. 1 is shown in FIG. 2. The receiver consists of an antenna 24 and a sensor 25 constructed along conventional means for converting the electromagnetic waves back into pulse coded information. The sensor 25 is connected to an input of an amplifier 26. The amplifier 26 may have a feedback loop 27, though such a loop 27 is not absolutely required in view of the use of the pre-signal generated by the transmission means of FIG. 1. The single feedback loop 27 adds further insurance that information will not be lost or distorted in addition to the use of the pre-signal. The use of multiple feedback loops constructed in a cascaded manner is not needed, and the single feedback loop 27 does not appreciably add to the expense or manufacturing difficulty of a receiver module. Upon input of the pre-signal pulse to the amplifier 26, the amplifier begins operation, including an initial response time during which processing of data through the amplifier 26 may be distorted. Because the pre-signal pulse is the only information in the amplifier at this time, such distortion is of no consequence because the pre-signal pulse includes no command information. The command information in the form of pulse coded words which follows the pre-signal pulse will thus be processed by the amplifier 26 without distortion.

The information leaving the amplifier 26 is sent to a decoder 28 which interprets the received information and directs it to appropriate addresses such as 29 and 30.

Operation of a receiver receiving pulse coded information without exact temporal alignment of the pulses and the amplifier operation is shown in FIG. 3. Commands having a duration $t_e$ may be distorted or lost as shown in the top line of the graph of FIG. 3 when the response time of an amplifier in the receiver coincides with a portion of the command period. When coincidence of the amplifier response time and receipt of the entire coded pulse does not occur, the information contained in the pulse group is completely transmitted without distortion, as shown on the lower line of the graph in FIG. 3.

Although various modifications and changes may be suggested by those versed in the art, it is the intention of the inventor to embody within the patent warranted hereon all such changes and modifications as may reasonably and properly come within the scope of my contribution to the art.

I claim as my invention

1. An electronic data transmission system for transmission of pulse coded information having a transmitter means and a receiver means, said system comprising:
    a plurality of manually actuatable command input means;
    a pulse generator actuated by any of said command input means for producing information pulses representing commands according to selected inputs;
    a means for producing a pre-signal pulse simultaneously with actuation of any input command;
    a means for combining said pre-signal pulse and said information pulses such that a pre-signal pulse associated with respective pulse information is transmitted prior to said information to said receiver means; and
    an amplifier in said receiver means having a fixed response time,
whereby said amplifier is activated by said pre-signal pulse so that said response time has elapsed prior to introduction into said amplifier of pulse information associated with said pre-signal.

2. The electronic data transmission system of claim 1 wherein the means for combining said pre-signal and said information pulses includes a delay switch to delay transmission of said pulse information until a fixed time after production of said pre-signal.

3. The electronic data transmission system of claim 2 wherein the delayed pulse information and the pre-signal each comprise an input to an OR-gate having its output connected to said transmitter means.

4. The electronic data transmission system of claim 1 wherein said receiver means further comprises a programmable decoder connected to an output of said amplifier for interpreting received pulse information and directing said information to designated addresses in accordance with a program.

* * * * *